May 2, 1933.  H. E. SCHRADER  1,906,339
CONVEYER SYSTEM
Filed May 23, 1930  7 Sheets-Sheet 1

Inventor.
Herbert E. Schrader
by Roberts, Cushman & Woodbury
Att'ys.

Inventor.
Herbert E. Schrader
Attys.

Patented May 2, 1933 1,906,339

UNITED STATES PATENT OFFICE

HERBERT E. SCHRADER, OF JENKINTOWN, PENNSYLVANIA, ASSIGNOR TO THE LAMSON COMPANY, OF SYRACUSE, NEW YORK, A CORPORATION OF MASSACHUSETTS

CONVEYER SYSTEM

Application filed May 23, 1930. Serial No. 454,976.

This invention relates to a method of conveying, to a conveying system and to apparatus suitable for use in such system, and has for some of its several objects to provide for the expeditious conveying of cars or other articles to a number of stations or operation points of a system, to provide for recirculation of articles which have passed the station or operation points for which they are destined in such a way as to present these articles again to such stations or operation points without causing congestion of the conveying system as a whole, to provide improved car or article selecting mechanism for determining the path of the cars or articles throughout the system, to provide improved mechanism for selectively transferring cars or articles from one conveyer to another conveyer of the system and to provide improved selective mechanism for removing cars or articles from a procession being conveyed, to provide construction of stations or operation points adapted to receive cars thus removed and to provide an improved method of supplying cars or other articles to intended stations or operation points.

Other objects and advantages of my invention will be apparent from the following explanation of specific instances of the invention illustrated by way of example in the accompanying drawings.

Figure 1:
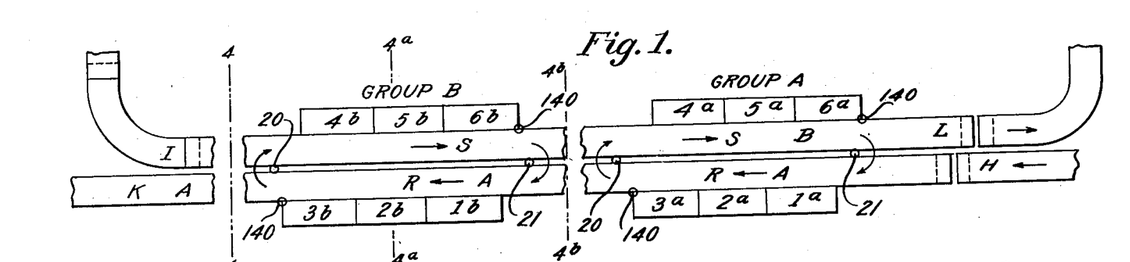
Fig. 1 is a diagrammatic plan view of a conveying system embodying my invention.

The conveying system shown diagrammatically in Fig. 1 as an illustrative and preferred embodiment of my invention includes a conveyer A which may be of any type, but is here illustrated as a belt running in the direction of arrows R, and comprising if desired a number of belt sections adapted successively to carry the conveyed articles. A number of stations or operation points are located adjacent the conveyer; for example, in Fig. 1, stations 1$^a$, 2$^a$ and 3$^a$ are provided.

My invention provides for the supply of articles to stations or operation points which may be arranged in one or more groups, the stations being located for instance according to a logical grouping of the operations to be performed upon the conveyed articles or a convenient arrangement of machinery used in performing sequential operations upon the conveyed article.

Thus, for example, stations 1$^a$, 2$^a$ and 3$^a$ are shown as grouped along conveyer A, the group which includes these stations being designated as group A. Associated with such a group I provide a supplemental conveyer B moving in the direction of the arrows S opposite to that of the above described conveyer A.

Such supplemental conveyer B may serve as an intra-group conveyer for serving certain stations of a group which may advantageously be disposed along this conveyer rather than along the primary conveyer A. Thus, for example, in Fig. 1, stations 4$^a$, 5$^a$ and 6$^a$ forming part of group A are disposed along conveyer B and are served thereby. To this end suitable transfer mechanism, diagrammatically indicated at 20 is provided for transferring articles from conveyer A to conveyer B in position to be presented to the stations 4$^a$, 5$^a$ and 6$^a$ served by conveyer B. Likewise to return articles from conveyer B to conveyer A, other transfer mechanism indicated at 21 is preferably provided. Such a conveying system therefore permits of supplying articles to stations located along two oppositely moving conveyers and further permits articles transferred from primary conveyer A to supplemental conveyer B to be thereafter returned to primary conveyer A.

Any number of groups of stations may be provided, in the present embodiment, a second group designated as group B and comprising stations 1$^b$, 2$^b$, 3$^b$, 4$^b$, 5$^b$ and 6$^b$ having associated therewith a supplemental conveyer B, is provided. To supply articles to such a second group, conveyer A is extended to, and preferably past, this group. Obviously the supplemental conveyers B of the one group need not constitute a continuation of the corresponding supplemental conveyer or conveyers of the other group or groups, conveyer A being adapted to effect the necessary inter-group conveying. Preferably, however, a single continuous conveyer B serves as a supplemental conveyer for the various groups, with the resulting capability of use as a primary conveyer for inter-group conveying. Thus by constructing both conveyers A and B continuous between groups, inter-group conveying may be effected concurrently in opposite directions.

In the operation of the system embodying the features thus far described, transfer of conveyed articles from one conveyer to another for presentation to predetermined stations is preferably effected selectively in accordance with predetermined characteristics imparted to the conveyed articles. A suitable construction of the transfer mechanisms 20 and 21 of the one or more groups, adapted to this mode of selective transfer is described hereinafter. By such selective transfer of articles between conveyers, obviously articles fed onto conveyer A may be transported automatically to any station in any group of the system, and from thence, by suitably altering the transfer-determining characteristic of the article, to a predetermined other station of the system. In case a plurality of groups of stations are employed and both conveyers A and B extend between these groups, as illustrated, articles may obviously be returned adjacent to their starting point by the arrangement of conveyers shown.

The above described arrangement of conveyer A, and selective transfer mechanism 20 and 21 and adjacent portions of conveyer B constitutes an embodiment of recirculating mechanism which may advantageously be made use of in this or other conveying systems.

Obviously, if a given article destined to be operated on at station 1$^a$ were to pass that station only once, at which time it was essential that it be operated upon, the passage of other articles destined for or leaving other stations of the system would be interrupted by any delay by the operator or mechanism at this station. Hence, articles destined for any given station and not operated upon at their initial arrival at that station are preferably recirculated in the system and presented again, and any number of times necessary, to that station.

Preferably, as in the illustrated conveying system comprising groups of stations, articles thus recirculated are not conveyed in such circulatory movement over the entire conveying system, which may be very extensive, but are recirculated merely within the group which contains the station to which they are destined. Thus conveyer runs extending between groups are not congested by the unnecessary circulation of articles which have passed their intended stations and must be again presented thereto, nor are groups in the system congested by the passage therethrough or the recirculation therein of articles which are on their way to be presented a second or subsequent time to a station which they have once passed. For instance, in the embodiment of Fig. 1 articles destined for stations 1ª, and having passed this station without having been operated on, may at any time be recirculating on belts A and B through group A and being successively presented to this station 1ª for which they are intended, while simultaneously a similar recirculation of articles intended for one of the stations of group B, for instance station 1ᵇ, may be taking place within group B. The effect of such simultaneous recirculation is thus not additive in causing congestion of the system as a whole.

Preferably in providing for such recirculation of articles, the transfer mechanism employed in transferring articles from one belt to the other for presentation to a station on the latter belt is employed, and the transfer of an article from one belt to the other belt for the purpose of recirculation is effected in the same manner as the transfer of one article to the other for the purpose of initially presenting it to a station on the second belt. For this mode of operation, the selective transfer mechanism, for instance transfer mechanism 20 situated at the end of a group, is adapted to respond to all articles having a characteristic common to the group. Likewise, in order to effect a complete circuit within a group of articles thus recirculated, transfer mechanism is provided at opposite ends of the group (preferably as explained above, the same transfer mechanism employed in transferring articles initially carried by one conveyer to stations on the opposite conveyer), both of these transferring mechanisms being responsive to all articles having the group characteristic of the group.

To illustrate the possibilities of operation of a system having these preferred arrangements, the following instances may be cited: an article intended for station 1ª may be placed on conveyer A at point H and conveyed thereby to station 1ª. If the operator at station 1ª is able to perform the desired operation upon the article, the operator may so alter the contact mechanism of the article as to determine its subsequent transport to any other desired station, for instance, station 2ᵇ of group B. In this instance the article is subsequently transported by conveyer A past the transfer mechanism 20 which is now non-responsive to the B group characteristic of the article, and thence to the intended station. However, if the operator is unable or not ready to perform the intended operation upon the article, or if, in case the article is to be removed from the conveyer at station 1ª, it can not at the time be thus removed, the article will pass station 1ª, proceed to the transfer mechanism 20 which is responsive to it, be transferred to conveyer B, be conveyed thereby to transfer mechanism 21 which is also responsive to it, be returned thereby to conveyer A and again presented to the intended station 1ª, such recirculating of the article taking place any desired or necessary number of times. Such recirculation of articles may take place in the case of all articles destined for any of the stations of group A, for example an article destined for station 5ª will proceed along conveyer A to transfer mechanism 20 which is responsive to its group A characteristic and thereafter be presented by conveyer B to station 5ª, either with or without subsequent recirculation within group A. After reaching station 5ª the article may be removed from the conveyer or may either immediately or after being returned to the conveyer have its group characteristic altered to determine subsequent transport of the article to another station of another group.

It may be desired, after first presenting articles to a given station on one conveyer, subsequently to convey these articles to another group by means of the opposite conveyer, for instance after presenting articles to station 5ª (on conveyer B), subsequently to convey them to a station of group B involving inter-group transfer by conveyer A. Accordingly the transfer mechanism which serves to transfer such articles after passing their initially destined station to the conveyer which conveys them to the group of the second intended station preferably is responsive to articles having the characteristic common to the second group to which articles are to be conveyed. Thus, in the event that the conveying system of Fig. 1 is to be fed primarily at H and conveyer A is to constitute the primary inter-group conveyer with belt B functioning mainly as a supplemental intragroup conveyer to supply those stations not adjacent to belt A and to recirculate articles within groups, the one or more transfer mechanisms 21 serving to return articles from conveyer B to conveyer A should be responsive to articles having not only the group characteristic of the group in which the transfer mechanism is situated, but also to other articles having the group characteristic of any succeeding groups to which articles may be conveyed from stations 4ª, 5ª and 6ª of group A. The transfer mechanism 21 of group A would accordingly be responsive to all articles having either group A characteristics (for recirculation in group A) or group B characteristics (for subsequent transport by conveyer A to group B).

While my invention in one aspect is concerned with presenting the conveyed articles to various stations or operation points, the system provides also for the carrying away of articles from these various stations and conveying them to other stations of the system or to suitable delivery points which in the present instance are indicated by reference characters K and L on conveyers A and B respectively. Obviously in some instances the carrying away of articles may follow immediately their presentation to the intended stations, the articles either passing continuously the stations for which they are destined or pausing if necessary while the desired operations are performed upon them. However, my invention in certain aspects contemplates the removal of the conveyed articles at the stations for which they are destined and, if desired, their subsequent replacement upon the conveyer and further transport thereby.

Figure 2:
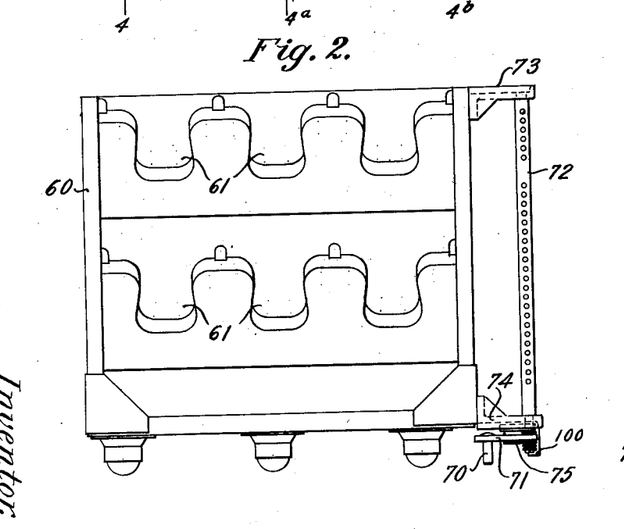
Figs. 2 and 3 are side and end elevations respectively of a car suitable to be used as one of several circulating articles in the system.

Thus in the preferred embodiment of my invention, means for selectively removing articles from the adjacent conveyer is provided at each of the stations, a specific form of such means being described hereinafter. Preferably the articles conveyed, such as the cars of Fig. 2, are provided with contact mechanism prearranged to cooperate with the article removing mechanism of one or more stations to initiate the removal of the articles. Such article-carried contact mechanism may advantageously be the same as that employed for initiating the transfer of articles from one conveyer to the other, for instance, in order to supply stations served by belt B with articles initially conveyed by belt A, or in recirculating articles for successive presentation to a station. Preferably the contact mechanism carried by the articles is arranged to provide each article conveyed with predetermined group and station characteristics so that articles may be conveyed to the intended group and station as directly as possible. In this case the prearranged group characteristic of the article regulates the order of travel of the article over the conveyers by selectively actuating the transfer mechanisms, while the combination of the group and station characteristics of the article determines the station at which the article is removed. Preferably in utilizing the capability of the system to recirculate articles for successively presenting them to the same station, the article-removing mechanism is arranged to allow articles to pass without removal when desired, or when the particular station can not receive further articles.

Figure 4:
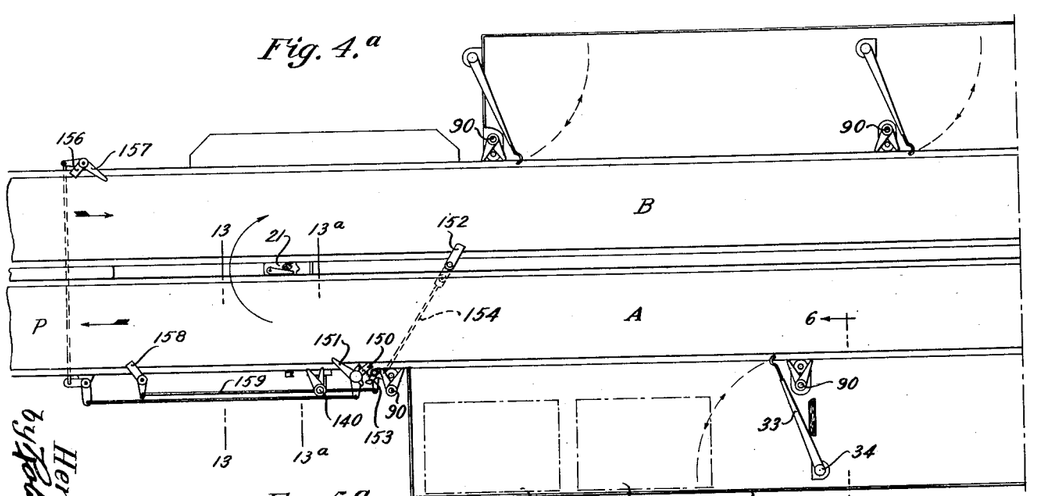
Figs. 4ᵃ and 4ᵇ are plan views of adjoining portions of the conveying system shown in Fig. 1, and together show one group of six stations, Fig. 4ᵃ showing that part of one group of the system lying between the lines 4—4 and 4ᵃ—4ᵃ of Fig. 1, and Fig. 4ᵇ showing that part of the same group lying between the lines 4ᵃ—4ᵃ and 4ᵇ—4ᵇ of Fig. 1.
Figures 4, 5:
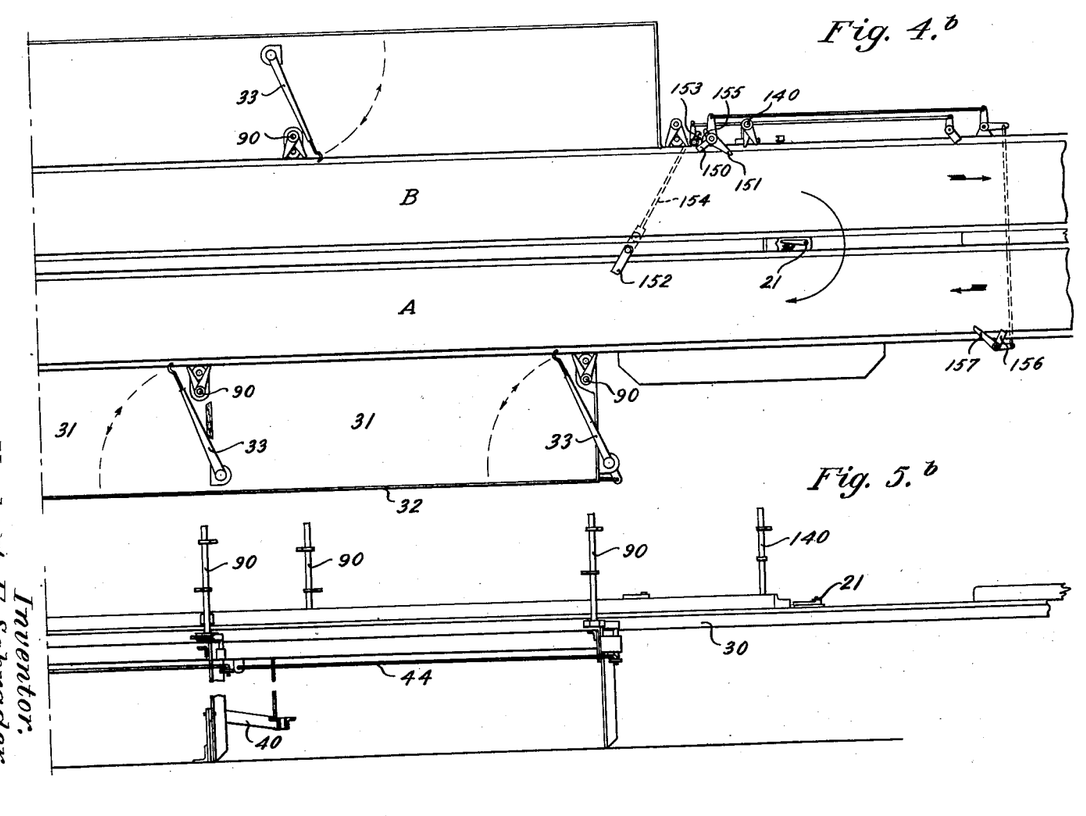
Figs. 5ᵃ and 5ᵇ are side elevations of those portions of the system shown in Figs. 4ᵃ and 4ᵇ respectively.
Figure 5:
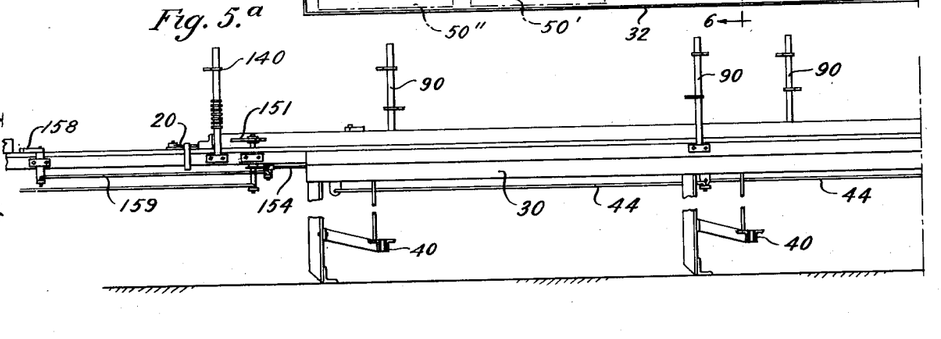
Figures 6, 18:
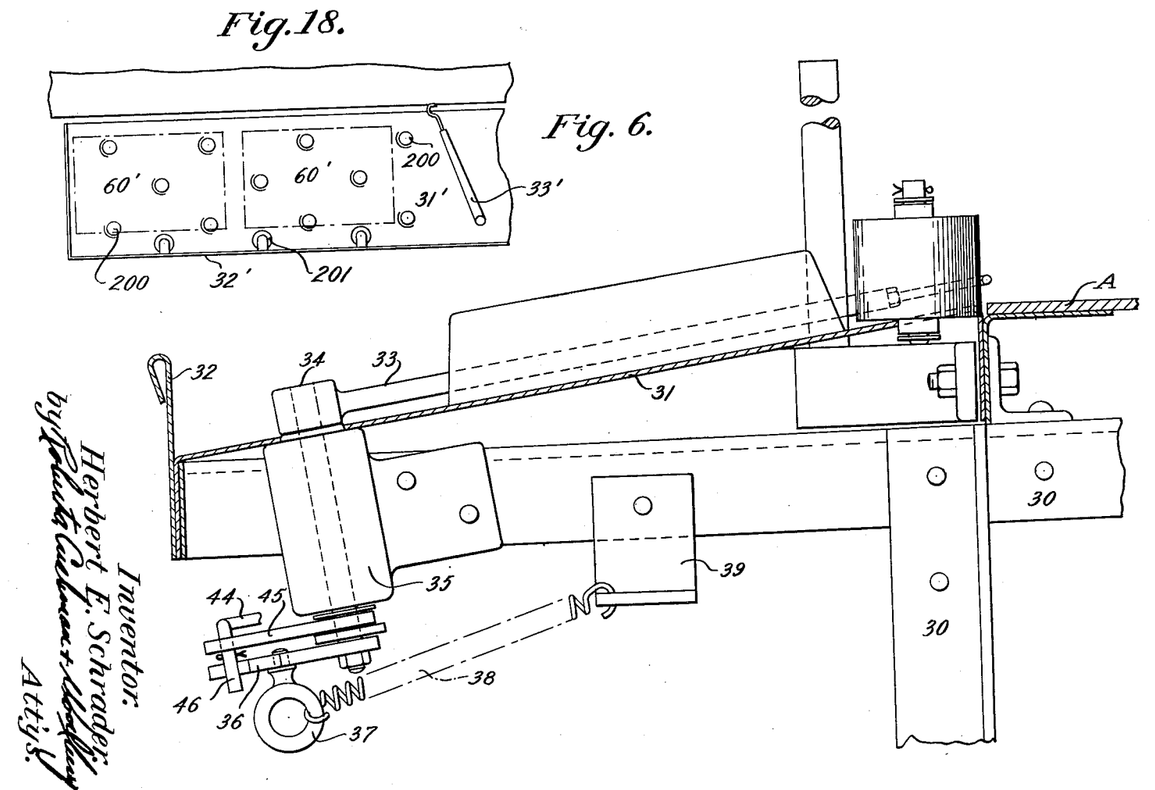
Fig. 6 is a section on the line 6—6 of Fig. 4ᵃ.
Fig. 18 is a plan view of another type of station.

Referring to Figs. 4<sup>a</sup>, 4<sup>b</sup>, 5<sup>a</sup>, 5<sup>b</sup>, and 6, the conveying belts A and B are preferably carried on elevated framework indicated generally by the reference character 30. These stations which may serve either as operation points, for instance as work benches, or as sources of supply for other conveyers or entirely separate machinery, preferably comprise platforms 31 extending to the side of the adjacent belt so that articles may easily be transferred by sliding or rolling from the belt to the platform. A guard rail 32 may be provided at the side of the platform opposite the belt to retain articles on the platform. The platforms 31 preferably slant down from the adjacent belt so that articles which once begin to leave the belt may be moved by the force of gravity entirely off the belt and will slide into contact with the guard rail 32.

Figure 10:
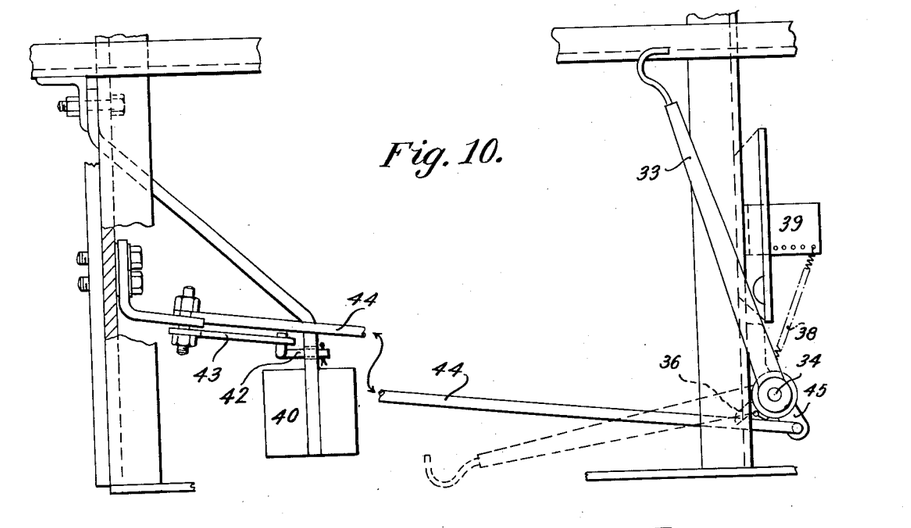
Fig. 10 is a plan view of the article removing mechanism of a given station or operation point, superposed parts of the conveyer being eliminated in this view to show the hook resetting mechanism below the platform of the station.

Any desired form of article removing mechanism may be employed, if desired, to remove the conveyed articles from the belt. In the present instance I have illustrated a preferred form of article removing mechanism which comprises a pivoted hook 33 normally extending into the path of articles moving on the adjacent conveyer belt and adapted to be swung about its pivot shaft 34 by articles with which it engages into a non-deflecting position wherein it clears succeeding articles on the conveyer. Preferably articles conveyed are provided with abutments (of which a preferred construction is described hereinafter) suitable to engage with the hooks 33. Upon engagement of an abutment of an article with a hook, the article is then constrained to move in the general path of an arc about the shaft 34 and is moved through this path by the combined effect of gravity and the tractive force of the conveyer or forward momentum of the article. Preferably means are provided for yieldingly retaining the article removing hook normally in a deflecting position to draw articles from the belt. Referring to Fig. 6, the shaft 34 on which the hook 33 is fixed is mounted in a bearing 35 substantially normal to the sloping platform 31. Upon the lower end of the shaft 34 is mounted an arm 36 to which is connected by means of an eye 37 a spring 38 fastened to any fixed part of the framework, for instance to the angle bar 39. This yielding means for retaining the article-removing hook in a deflecting position is preferably arranged to be effective only during a portion of the movement of the hook from its deflecting position. Referring to Fig. 10, the arrangement of a spring 38 and arm 36 with respect to the shaft 34 is such that when the hook 33 is in its normal position ready to engage articles on the belt, the arm 36 lies on one side of the pivot shaft 34. The force of the spring 38, however, is not strong enough to prevent the rotation of the hook 33 about the pivot shaft 34 under the influence of the article being removed. Referring to Fig. 10, it will be observed that a certain amount of swing of the hook 33 will carry the arm 36 into a position on the opposite side of the pivot shaft 34. In this position the spring, instead of resisting movement of the hook 33 to the left, resists movement of the hook to the right and tends to hold the hook in the non-deflecting position shown in dotted lines in Fig. 10.

Figures 11, 12, 19, 20:
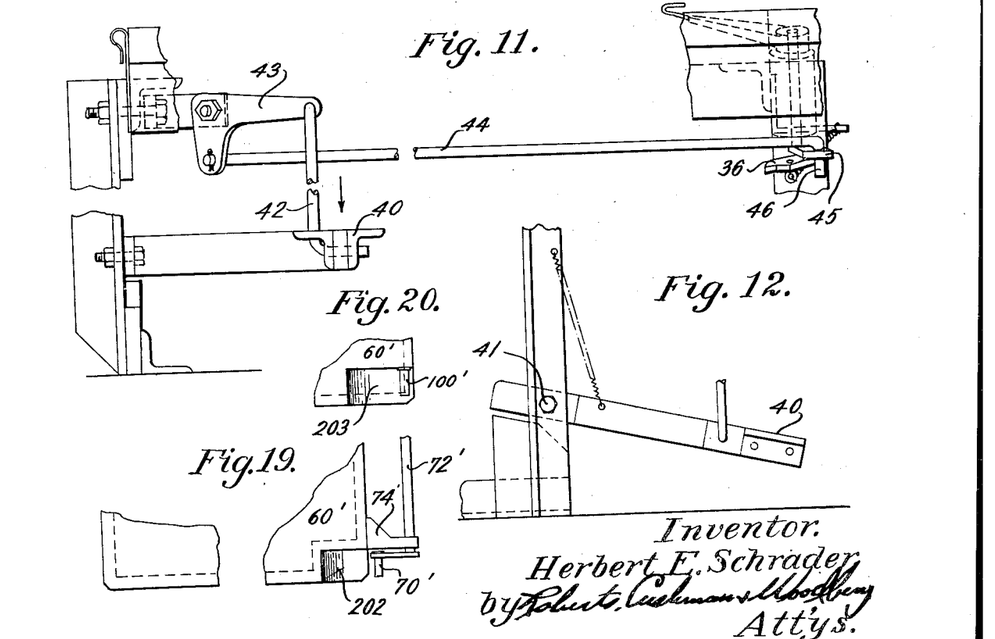
Fig. 11 is a fragmentary side elevation of the hook resetting mechanism of Fig. 10.
Fig. 12 is a fragmentary side elevation of the treadle shown in Figs. 10 and 11.
Figs. 19 and 20 are fragmentary side elevations of a car adapted for use with such station.

Suitable mechanism is preferably provided for returning the hook 33 to its article removing position. In the present instance such means is provided in the form of a treadle 40 (Figs. 10, 11 and 12) pivotally mounted to the framework of the platform at 41 and connected by a rod 42, a bell-crank arm 43 and a rod 44 to a link 45 (Figs. 6 and 11) loosely mounted on the pivotal shaft 34. Referring to Figs. 6 and 11, a downwardly extending end 46 of rod 44 lies in the plane of movement of the arm 36 which is fixed on shaft 34. Thus by depressing treadle 40, the rod 44 and its depending end 46 may be moved to the left in Figs. 10 and 11, the end 46 of shaft 44 engaging the arm 36 and serving to swing the shaft 34 and hook 33 in a clockwise direction whereby the hook 33 is returned to its article removing position.

Figure 3:
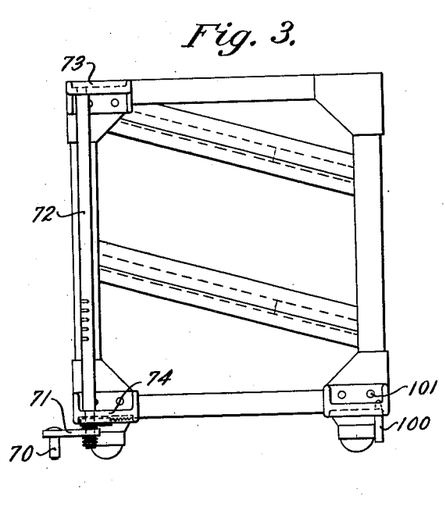

In the present instance wherein cars as shown in Figs. 2 and 3 are employed, each of the stations may be for example of sufficient size to hold two of the cars, one car being able to occupy the position shown in dotted lines 50' in Fig. 4ª at the left of the station, while another car occupies the position shown in dotted lines 50'' adjacent to the first car. A car occupying the position indicated at 50' will still be engaged by the article removing hook 33, and will obstruct the return of the hook to a deflecting position until removed. With this arrangement one article, such as a car, may be retained on the platform while it, or its contents, are being operated upon, while another similar car or other article is retained on the platform in a position readily accessible to the operator.

While obviously in the use of a conveying system such as described, any suitable selective mechanism may be employed to determine and regulate the path of travel of the articles, and, in case the articles are to be removed from the conveyer as explained above, to determine at what points they are removed, preferable mechanism for these purposes will now be described.

Figures 7, 8, 9:
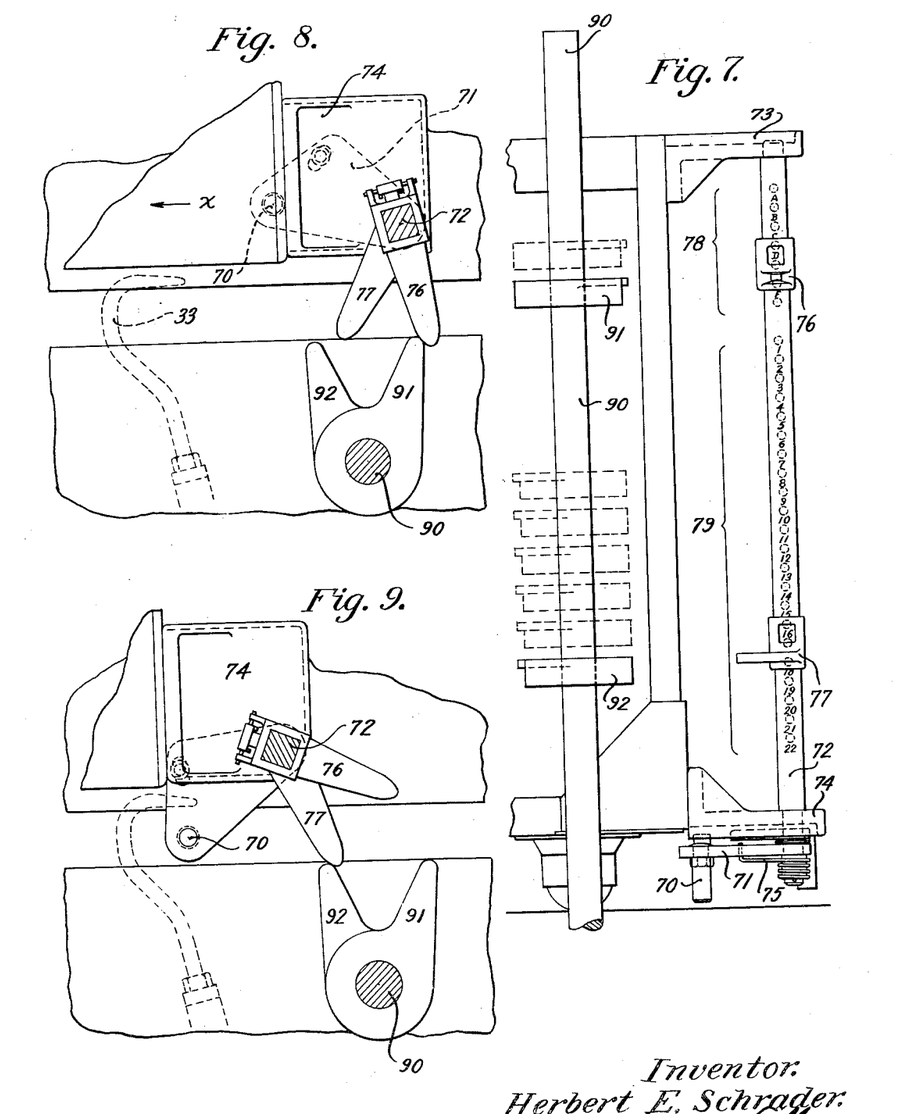
Fig. 7 is a fragmentary side elevation of the car of Fig. 2, on a larger scale, and showing also in elevation a fixed upright post carrying selector fingers for cooperating with movable contacts carried by the car.
Fig. 8 is a diagrammatic horizontal sectional view showing the manner of engagement of the movable contacts on a car or other conveyed article with article selector fingers located at the side of the conveyer, and further illustrates the corresponding position of a movable abutment actuated by the movable contacts.
Fig. 9 is a view similar to Fig. 8, showing the movable contacts moved by engagement with the stationary article selector fingers, into a position wherein the movable abutment actuated thereby may engage an article removing hook adapted to remove the car from the conveyer.

Referring to Figs. 2, 3 and 7, the articles conveyed are herein shown as cars 60 provided with racks 61 for carrying shoes. The car is provided with a movable abutment, herein shown as a pin 70 depending from an arm 71 which is fixed to a vertical rotatable shaft 72 supported by brackets 73 and 74, the movable abutment being adapted to cooperate with car removing mechanism, such for example as the hook 33 described above to effect removal of the car from the conveyer. At the rear left-hand corner of the car suitable yielding means such for example as the spring 75 is provided for normally urging the arm 71 in a clockwise direction and holding it in a position such as shown in Fig. 8 wherein the abutment pin 70 lies outside of the reach of the article removing hooks 33 as diagrammatically shown in Fig. 8.

Suitable contact mechanism, preferably arranged to impart to the car or other article group and station characteristics and preferably capable of being adjusted so that these characteristics may be altered at will, is provided on the car. In the present instance these functions are performed by a pair of fingers 76 and 77 mounted for vertical adjustment to occupy various positions on the shaft 72. Preferably a group of openings 78 is provided near the top of the shaft, with any one of which openings the upper finger 76 may be engaged. These upper openings on the shaft corresponding to various groups of a possible arrangement of the conveyer system and the upper finger 76 thus constitute a contact, the position of which imparts the desired group characteristic to the car. Likewise a lower group of openings 79 is preferably provided, the lower finger 77 being engageable with any of these openings to be retained thereby in any desired position of vertical adjustment. The lower finger 77 constitutes a station contact, imparting to the car the desired station characteristic.

Stationary selector means positioned at various points at the side of the conveyers are provided, capable of cooperating with the contact mechanism carried by the car or other conveyed article to cause the movable abutment 70 to be moved into operative position to engage an article-removing hook 33, or as explained hereinafter, to engage actuating means for the car transfer mechanism. Referring to Figs. 7, 8 and 9, a preferred construction of article-selector means comprises a vertical rod 90 carrying, at adjustable levels, a plurality of selector fingers of the same general type as the contacts carried by the car. In Fig. 7, this vertical shaft 90 may be part of a car-removing mechanism at one of the individual stations, in which case an upper group selector finger 91 is adjustably mounted at a predetermined level to contact with an article-carried contact corresponding to the group in which this selector mechanism is located. A station selector finger 92 is likewise adjustably mounted at a lower level in position to contact with a station contact corresponding to the station at which this selector mechanism is located. Thus, movement into operative position of the movable abutment 70 is effected by cooperative engagement of the two car-carried contacts 76 and 77 with selector fingers 91 and 92 positioned at corresponding levels.

Preferably, operation of the movable abutment is effected only by the successive contacting of the respective pairs of contacts and selector fingers. Thus, (see Figs. 8 and 9) the group contact 76 of the car first engages the stationary group selector finger 91, following which the station contact 77 of the car engages the station selector finger 92, engagement of both of these pairs of cooperating elements being necessary to move the movable abutment into operative position. This result may be obtained by disposing the car-carried contacts 76 and 77 at an angle to each other, and disposing the selector fingers at a similar angle to each other, as shown in Figs. 8 and 9. Referring to Fig. 8 wherein the group contact of the car has engaged a group selector finger 91, the movable abutment preferably is not moved completely into operative position by this engagement, but the vertical shaft 72 is rotated to a sufficient extent to bring the lower station contact 77 of the car into a position to engage a selector finger located at the corresponding level. Further movement of the car in the direction of the arrow $x$ of Fig. 8 causes this lower contact 77 to engage the station selector finger 92 and effect a further rotation of the vertical shaft 72 thereby to swing the movable abutment into the operative position of Fig. 9 in position to be engaged by the car removing or deflecting mechanism, such for instance as the hook 33. Obviously with this arrangement, if either the group contact 76 or the station contact 77 fails to engage a corresponding selector finger, the movable abutment 70 will not assume its operative position and the car will continue along the conveyer without being removed.

Figures 13, 14, 15, 16, 17:
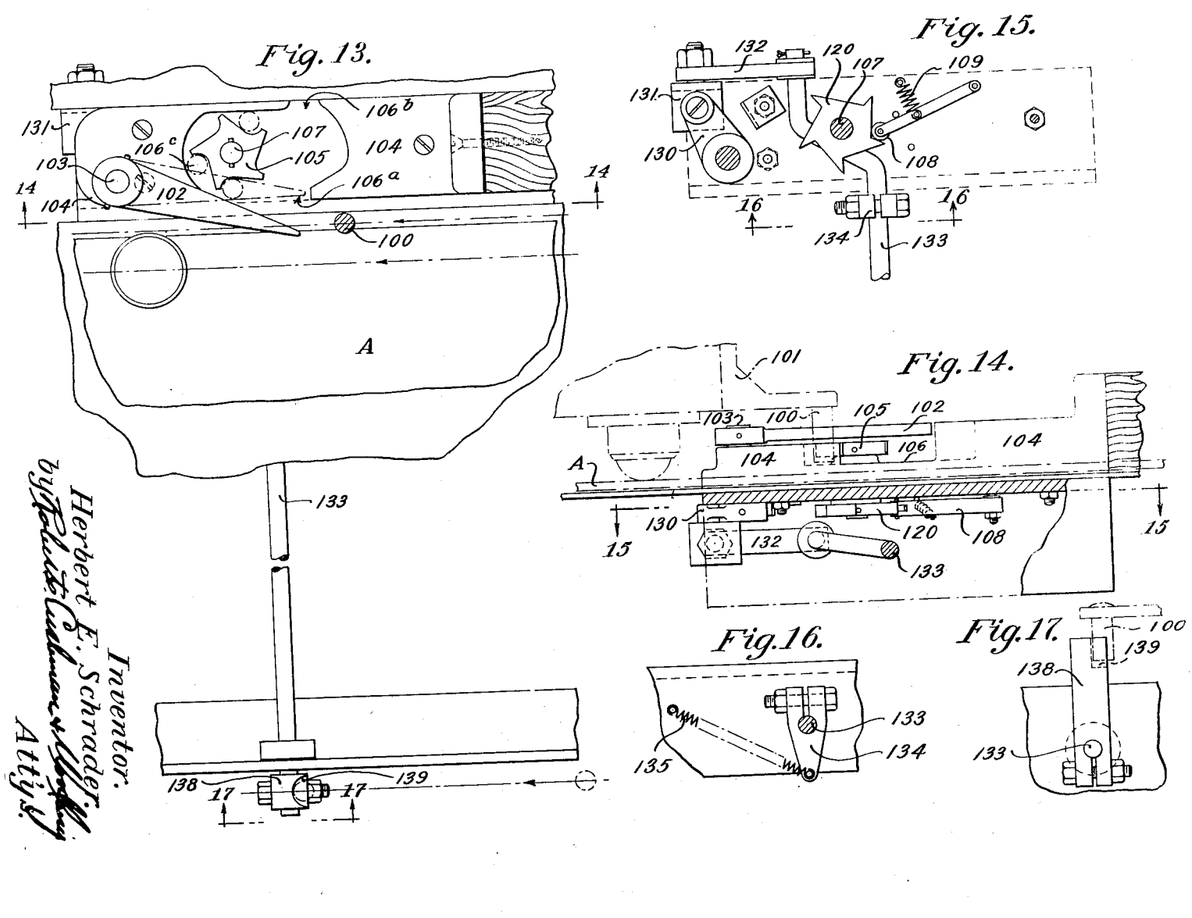
Fig. 13 is a plan view on an enlarged scale of one run of the conveyer included between the lines 13 and 13ᵃ of Fig. 4ᵃ and provided with article-transfer mechanism, for instance that indicated at 20 in Fig. 1, parts of the conveyer being broken away to illustrate certain structure lying below the conveying belt of the run.
Fig. 14 is a fragmentary vertical sectional view on the line 14—14 of Fig. 13.
Fig. 15 is a fragmentary horizontal sectional view taken on the line 15—15 of Fig. 14.
Fig. 16 is a fragmentary sectional view taken on the line 16—16 of Fig. 15.
Fig. 17 is a fragmentary side elevation taken on the line 17—17 of Fig. 13 and showing in dotted lines the engagement of a movable abutment of a car or other conveyed article with a lever for effecting operation of the transfer mechanism of Fig. 13.

Referring to Figs. 2 and 3 the car or other article conveyed is preferably provided with an abutment for engaging the transfer mechanism which serves to remove the cars from one belt, for instance belt A, and place them on the opposite belt. In the present instance this abutment comprises a pin 100 depending from a fixed bracket 101 on the rear right hand end of the article. Referring to Figs. 13 to 17, a preferred mechanism for transferring articles from one belt to the other and which may be utilized as the transfer mechanisms 20 and 21 provided in the system explained above, includes a deflector finger 102 fixed to a vertical shaft 103 which is pivotally mounted in a fixed casting 104, fitted between the runs of the conveyer, the deflector finger 102 being positioned as shown in Fig. 14 slightly above the level of the conveyer belts. In the normal and inoperative position of this deflector finger 102 indicated in dotted lines in Fig. 13, the abutment 100 carried by an article passes the deflector finger 102 without making contact therewith and the article to which the abutment is attached continues along its previous path. A toothed wheel 105 (Fig. 13) fixed to a shaft 107 is provided within a recess 106 in the casting 104. Referring to Fig. 13, the recess 106 is open at 106ᵃ to receive the fixed deflector abutment 100 of an article and is open at 106ᵇ to permit the disengagement of this abutment, the recess thus leading from adjacent one conveyer to adjacent the other conveyer. One wall 106ᶜ of the recess is disposed in the form of an arc to provide an arcuate path for abutments 100 in contact with the toothed wheel 105. Upon movement of the deflector finger 102 into its outer and operative position as shown in Fig. 13, a deflector abutment 100 upon a moving article will be engaged by this deflector finger 102, and deflected into contact with one of the teeth of the wheel 105. The forward motion of the conveyer upon which the article has been travelling, as well as the momentum of the article swings the article about this abutment 100, from one conveyer onto the other. This swinging movement of the article, coupled with the pull upon the article by the conveyer which thus receives the article, serves to move the article-carried deflector abutment 100 in an arcuate path along the curved wall 106ᶜ of the recess in the casting 104 thus forcing the toothed wheel 105 to rotate. Upon rotation of the wheel 105 through about 180 degrees, the article-carried abutment 100 becomes disengaged therefrom and is drawn out through the side opening 106ᵇ of the recess 106 by the pull of the conveyer upon the article. The toothed wheel 105 and its co-operating recess 106 in the casting are arranged yieldingly to oppose movement of the deflector abutment of an article from one conveyer to the other. This result is preferably accomplished by the provision below the casting of a cam wheel 120 mounted on the vertical shaft 107 and co-operating with a follower 108 forced against its outer surface by spring 109 to oppose rotation of the shaft 107 and hence of the upper toothed wheel 105. By thus opposing motion of the abutment through the path afforded by the recess 106 from adjacent one conveyer to adjacent the other conveyer, the swinging of the car or the article and the movement of the car or article-carried abutment are effected simultaneously, the abutment functioning as a moving pivot for the car or article.

Preferably selective mechanism is provided for actuating the deflector finger 102. Since as explained in connection with the general arrangement of a preferred system, it is desirable to transfer articles from one conveyer upon which they are initially transported to the opposite conveyer which delivers them to their intended stations or operation points, and furthermore since it is desirable to recirculate articles within a particular group by transferring them from one conveyer to the other, selective mechanism is preferably provided for causing the deflector to be actuated by articles having predetermined group and station characteristics. In the present instance the vertical shaft 103 upon which the deflector finger is mounted carries below the casting 104 an arm 130 (Fig. 15) having at its outer end a universal joint 131 which, in turn, is connected by a link 132, to the offset end of a crank shaft 133 extending to the opposite or left hand side of the adjacent belt. The crank shaft 133 which is suitably mounted for rotation in the under frame of the conveyer carries at its outer or left hand end an arm 138 (Figs. 13 and 17) disposed in alignment with the outer or operative position of the movable abutment 70 of the article about to be transferred and suitably recessed at 139 to retain the movable abutment of the article in contact therewith following its initial engagement. The selective mechanism for transferring articles includes also a vertical shaft 140 similar to the vertical shaft 90 shown in Fig. 7 and previously described in connection with the mechanism for causing removal of articles at respective stations. Any desired arrangement of selector fingers is provided so that upon the engagement of predetermined group and station contacts of an article with corresponding group and station selector fingers on the vertical shaft 140, the movable abutment 70 of the article will strike and move the arm 138 to operate the deflector finger 102 and effect transfer of the article to the opposite conveyer.

Various arrangements of group and station selector fingers upon the vertical shaft 140 adjacent the contact finger 138 are possible. As explained in connection with the general plan and operation of a preferred system, it may be desirable to recirculate within a group of stations all articles having the group characteristics of that group and which have passed the station to which they were destined without having their group characteristics changed. For this mode of operation, the vertical selection-finger supporting shaft 140 cooperating with the transfer mechanism may be provided with station selector fingers sufficient in number to contact with any article-carried station contact corresponding to a station of the group. Fig. 7 indicates in dotted lines positions in which additional station selector fingers may be located on a shaft 90 to this end. With such arrangement transfer of articles from one conveyer to the other would be controlled primarily by the group characteristics of the articles. Accordingly the vertical selector-finger supporting shaft 140 associated with the transfer mechanism of a group is provided with a group selector finger in the position corresponding to that group, to effect transfer of articles of that group. Furthermore by providing a larger number of group selector fingers, for instance by adding a group selector finger as indicated by dotted lines in Fig. 7, the transfer mechanism may be rendered responsive to articles having group characteristics of other groups. For instance in case articles are to be sent from any stations $4^a$, $5^a$ or $6^a$ of group A to a station in group B, and group A is to function as a recirculating unit for articles having group A characteristics, transfer mechanism 21 at the right of group A may have both A and B group selector fingers.

A non-interference mechanism described more fully and claimed in the copending application of Charles R. Libby, filed on even date herewith bearing Serial No. 454,935, is preferably employed in connection with the article-transfer mechanism just described. This non-interference mechanism is useful in preventing an article which is being transferred from one conveyer to the other from being struck by a following article, and is furthermore useful in preventing an article which has been transferred to a conveyer from colliding with another article moving on the same conveyer.

Such a non-interference mechanism, shown in Figs. $4^a$ and $4^b$ as applied to opposite ends of a group of stations, comprises a stop 150 movable by the engagement of an arm 151 with a passing article into a postion in the path of succeeding articles to prevent their passage. The article which has engaged passage with arm 151 may then be transferred by the transfer mechanism 21 to the opposite conveyer without danger of being struck by succeeding articles. In its movement in the opposite direction upon the opposite conveyer, for instance conveyer B, such transferred article engages a pivoted trip 152, moving this trip out of the path of the article, and releasing a latch 153 to which it is connected by a link 154. The stop 150 is then free to move under the influence of a suitable spring 155 to an inoperative position to permit succeeding articles to pass without interruption. The stop and article-engaging arm 150 and 151 respectively are duplicated upon the opposite conveyer at 156 and 157 respectively, the opposite arms and stops being interconnected as shown so that the actuation of stop 150 by the arm 151 also serves to actuate the stop 156 thus to prevent passage of articles past this stop 156 on the opposite conveyer B. In this way an article which is being transferred from conveyer A to conveyer B will not collide with an article moving straight along conveyer B. The stop 156 is likewise moved into inoperative position when the transferred car strikes the trip 152. The arm 157 will be engaged by an article advancing upon the conveyer B and will actuate both the stop 156 and the stop 150. A second trip 158 connected to the latch 153 by a link 159 will be engaged by an article destined for continued travel along the conveyer A and will thereupon restore the stops 150 and 156 to their normal inoperative position.

The mechanism previously described includes a car having casters thereon but it has been found that cars with flat bottoms and no casters may be used in which case it has been found advisable to provide the stations with casters and in some instances with guide rollers to facilitate the movement of the cars thereon. Such a construction is illustrated in Figs. 18 and 19 of the drawings. In Fig. 18 the station platform 31' has thereon casters 200 on which the cars rest while guide rollers 201 are mounted upon the guard rail 32' and project over the platform. The car 60' (Figs. 19 and 20) has a flat bottom and in order to permit movement of the pin 70' the bracket 74' which supports the lower end of the shaft 72 is mounted above the lower edge. The arm 71' from which the pin 70' depends can move freely under the bracket as shown in Fig. 19. One corner of the car is cut away at 202 to provide clearance for the movable hook 33'. The opposite rear corner of the car is similarly cut away at 203 (Fig. 20) and within the cut away portion is mounted the pin 100' which coacts with the transfer mechanisms 20 and 21.

The operation of this system has been set forth at length in connection with the description of the various details of the illustrated embodiment. It will be understood that I am not limited to the embodiment shown and described since other embodiments might be made without departing from the spirit and scope of the invention as set forth in the following claims.

I claim:

1. Conveying mechanism comprising a conveyer, means for selectively removing therefrom at a point thereon articles having predetermined group and station characteristics corresponding to said point, means for selectively diverting from the conveyer articles having the same predetermined group characteristic after passing said article-removing means, and article-recirculating means for returning articles thus diverted to said conveyer in position again to be presented to said article-removing means.

2. Conveying mechanism comprising a conveyer, means for selectively removing therefrom at a point thereon articles having predetermined group and station characteristics corresponding to said point, means for selectively diverting from the conveyer articles having the said predetermined group characteristic, article-recirculating means for returning articles thus diverted to said conveyer in position again to be presented to said article-removing means, and means for selectively removing articles from said article-recirculating means.

3. Conveying mechanism comprising a conveyer, means for selectively removing therefrom at a point thereon articles having predetermined group and station characteristics corresponding to said point, means for selectively diverting from the conveyer articles having the said predetermined group characteristic, article-recirculating means for returning articles thus diverted to said conveyer in position again to be presented to said article-removing means, and means for selectively removing from said article-recirculating means at a point thereon articles having predetermined group and station characteristics corresponding to said point.

4. Conveying mechanism comprising a conveyer for presenting articles to a group of stations, means at said respective stations for selectively removing article having predetermined station characteristics corresponding to the respective stations and having a predetermined group characteristic corresponding to the group of stations, means for selectively diverting from the conveyer articles having the said predetermined group characteristic which have passed certain stations, article-recirculating means for carrying articles thus diverted past another station and returning them to said conveyer in rear of said first-named stations.

5. Conveying mechanism comprising a conveyer for presenting articles to a group of stations, means at said respective stations for removing articles having predetermined station characteristics corresponding to the respective stations and having a predetermined group characteristic corresponding to the group of stations, means for selectively diverting from the conveyer articles having the same predetermined group characteristic which have passed certain stations, means for carrying articles thus diverted past another station, means at said last-named station for selectively removing articles having predetermined characteristics, and means for returning articles passing said last-named station to the first-named conveyer in rear of said first-named stations.

6. Selective conveying mechanism comprising a conveyer, article-removing means for removing articles therefrom, an article selector adjacent said conveyer, an abutment member carried by an article conveyed and movable relative thereto to a position operatively to engage said article-removing means for removal of the article from the conveyer, and means, including a contact member carried by the article and cooperating with said article selector, for determining the position of said abutment with respect to said article-removing means.

7. Selective conveying mechanism comprising a conveyer, article-removing means positioned at intervals along said conveyer for removing articles therefrom, article selectors corresponding to said respective article-removing means and positioned at intervals along said conveyer, an abutment member carried by an article conveyed and movable relative thereto to a position operatively to engage article-removing means for removal of the article from the conveyer, and means including a contact member carried by the article in position to contact with a predetermined article selector for controlling the operative engagement of the abutment member with article-removing means encountered thereby.

8. Selective conveying mechanism comprising a conveyer, article-removing means for removing articles therefrom, article-selectors positioned in pairs at intervals along the conveyer, respective pairs corresponding to respective article-removing means, an abutment member carried by an article conveyed and movable relative thereto to a position operatively to engage said article-removing means for removal of the article from the conveyer, and movable contacting and actuating means carried by the article in position to contact with a predetermined pair of article selectors for holding the abutment member in its operative position.

9. Selective conveying mechanism comprising a conveyer for carrying articles to a plurality of groups of stations, article-removing means disposed at respective stations for removing articles from the conveyer, group article selectors and station article selectors disposed at intervals along the conveyer, a group article selector and a station article selector corresponding to a respective station, an abutment member carried by an article conveyed and movable relative thereto to a position operatively to engage article-removing means for removal of article from the conveyer, and movable contacting and actuating means carried by the article in position to contact with the group article selector and article selector of a predetermined station for holding the abutment member in its operative position.

10. Selective conveying mechanism comprising a conveyer for carrying articles to a plurality of groups of stations disposed at intervals along the conveyer, article-removing means at respective stations for removing articles from the conveyer, group article selectors and station article selectors disposed at intervals along the conveyer, a group article selector and a station article selector corresponding to a respective station, an abutment member carried by an article conveyed and movable relative thereto to a position operatively to engage article-removing means for removal of the article from the conveyer, and movable contacting and actuating means carried by the article and including contact elements in position to contact in passing with the group article selector and the station article selector of a predetermined station, for holdidg the abutment member in its operative position.

11. Selective conveying mechanism comprising a conveyer for carrying articles to a plurality of groups of stations disposed at intervals along the conveyer, article-removing means at respective stations for removing articles from the conveyer, group article selectors and station selectors disposed at intervals along the conveyer, a group article selector and a station article selector corresponding to a respective station, an abutment member carried by an article conveyed and movable relative thereto to a position operatively to engage article-removing means for removal of the article from the conveyer, and movable contacting and actuating means carried by the article for holding the abutment member in its operative position when passing a predetermined station, said contacting and actuating means including a rotary member operatively connected to said abutment member, a contact element carried by said rotary member in position to contact with the group article selector of said station and a contact element carried by said rotary member in position to contact with the station article selector of said station.

12. Selective conveying mechanism comprising a conveyer for carrying articles to a plurality of groups of stations disposed at intervals along the conveyer, article-removing means at respective stations for removing articles from the conveyer, group article selectors and station selectors disposed at intervals along the conveyer, a group article selector and an associated station article selector corresponding to a respective station, an abutment member carried by an article conveyed and movable relative thereto to a position operatively to engage article-removing means for removal of the article from the conveyer, and movable contacting and actuating means for moving said abutment member to its operative position, said means being carried by the article and including a rotary member for rotating said abutment member, an element carried by said rotary member in position to contact with the group article selector of a predetermined station partially to rotate the said rotary member, and an element carried by said rotary member at an angle to said first-named element and movable with the rotary member upon contact of the first-named element with the group article selector into position to engage the station article selector of said station, further to rotate the rotary member.

13. Selective conveying mechanism comprising a conveyer for carrying articles to a plurality of groups of stations disposed along the conveyer, article-removing means at respective stations for removing articles from the conveyer, group article selectors and station article selectors disposed at intervals along the conveyer, a group article selector and an associated station article selector corresponding to a respective station, an abutment member carried by an article conveyed and movable relative thereto to a position operatively to engage article-removing means for removal of the article from the conveyer, and movable contacting and actuating means for moving said abutment to its operative position, said means being carried by the article and comprising a rotary member for rotating said abutment member, a group contact carried by said rotary member in position to engage in passing the group article selector of a predetermined station and to be rotated thereby and a station contact carried by said rotary member in position normally to clear the station article selectors and movable through rotation of said group contact into position to engage the station article selector of said station and to be rotated thereby.

14. In a conveying system the combination of two conveyers adapted to move articles in different directions, a recessed member adapted to receive in its recess an abutment carried by a conveyed article, the recess in said member leading from adjacent one conveyer to adjacent the other conveyer, a toothed rotary member within said recess, the teeth of said member being disposed to engage such abutments, and means for yielding opposing movement of said rotary member.

15. In a conveying system, a conveyer, a platform adjacent said conveyer to receive articles removed therefrom, said platform sloping down and away from said conveyer, and a swinging article-engaging member associated with said platform for drawing articles from the conveyer onto the platform, said article-engaging member being mounted upon an inclined axis substantially normal to said inclined platform, thereby to maintain engagement with an article drawn from the conveyer during movement of the article away from the conveyer.

Signed by me at Philadelphia, Pennsylvania, this sixteenth day of May, 1930.

HERBERT E. SCHRADER.